Patented Oct. 10, 1933

1,929,876

UNITED STATES PATENT OFFICE 1,929,876

VAT DYESTUFFS OF THE ANTHRAQUINONE NAPHTHACRIDONE SERIES AND PROCESS OF MAKING THEM

Philip Fletcher Bangham and Robert Fraser Thomson, Grangemouth, Scotland, assignors to Imperial Chemical Industries Limited, a corporation of Great Britain No Drawing. Application June 24, 1931, Serial No. 546,666, and in Great Britain July 1, 1930

30 Claims. (Cl. 260—37)

This invention relates to new intermediates and vat dyes from anthraquinone-naphthacridone.

It is an object of the invention to provide new compounds which are valuable either as vat dyes or as intermediates for vat dyes. It is a further object of the invention to provide vat dyes which yield very fast grey shades on textile fibres.

The starting material for the products of our invention is anthraquinone-1.2.2'.1'-naphthacridone (Caledon Red BN) to which the following formula has been assigned:

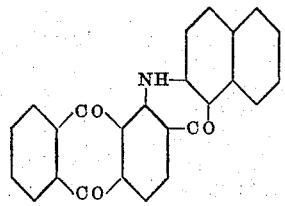

According to our invention we treat this compound with nitrating agents, whereby di- or polynitro-derivatives of undetermined constitution are obtained. These nitro-derivatives are valuable intermediates. On reduction they yield di- or poly-amines, which on acylation are converted into vat dyes.

The invention is illustrated but not limited by the following examples, in which the parts are by weight.

EXAMPLE 1

*Nitration of anthraquinone-1.2.2'.1'-naphthacridone*

10 pts. of anthraquinone-1.2.2'.1'-naphthacridone (Caledon Red BN) are gradually added with stirring to 20 pts. of concentrated nitric acid (94%), keeping the temperature at 20 to 25° C. After stirring for 1 hr. the mixture is poured into water and filtered. The product appears to be a dinitro compound and has a bright orange color. The yield is almost theoretical.

Alternatively the nitration mixture may be filtered directly without dilution, whereby an improved product is obtained.

A similar product results when the nitration is performed in the presence of an organic medium, e. g. nitrobenzene or o-dichlorobenzene.

EXAMPLE 2

*Reduction of the product obtained in Example 1*

10 pts. of the nitrated material obtained in Example 1 is made into a fine paste with 200 parts of water. The temperature is raised to 70 to 80° and 20 pts. sodium sulphide crystals are added. After 6 hours at 70 to 80° C. the mixture is filtered, and the filter-cake is copiously washed with water. The yield is almost theoretical.

EXAMPLE 3

*Benzoylation of the product obtained in Example 2*

10 pts. of the product obtained in Example 2 and 80 pts. of nitrobenzene are heated together with stirring to 150 to 160° C. and 10 pts. of benzoyl chloride are added. After 1 hr. at 150 to 160° C. the mixture is cooled and filtered, washed with a little nitrobenzene and then with methylated spirits until the filtrate is colorless. The yield is about 70%. The product is a dark bluish grey powder. It dyes fast grey shades on cotton from a brown-purple vat.

By treating this body with sodium hypochlorite solution the fastness to chemick is improved.

Other high-boiling solvents, such as o-dichlorobenzene, may replace the nitrobenzene in this example.

EXAMPLE 4

10 pts of anthraquinone 1.2.2'.1'-naphthacridone are added with stirring to 50 parts of 94% nitric acid at 30°. After stirring for 1 or 2 hours the crystalline precipitate is filtered from the strong acid, washed with 60% nitric acid and then with water. The product appears to be a trinitro derivative.

By reduction and benzoylation as in Examples 2 and 3 a grey vat dyestuff is obtained.

EXAMPLE 5

10 pts. of anthraquinone 1.2.2'.1'-naphthacridone, 100 parts of nitrobenzene and 35 parts of 94% nitric acid are stirred at 90° C. for three hours. The melt is then cooled and filtered and the precipitate washed with cold nitrobenzene. The product appears to be a dinitro derivative.

On reduction and benzoylation a grey vat dyestuff is obtained which dyes in slightly redder shades than those previously described.

EXAMPLE 6

10 pts. of the anthraquinone 1.2.2'.1'-naphthacridone are added gradually with stirring to 50 parts of 94% nitric acid at 50–55° C. and the temperature maintained for one hour. The charge is cooled and filtered.

The product appears to be a tetra nitro derivative which on reduction and benzoylation gives a grey vat dyestuff considerably redder than those previously described.

Example 7

10 pts. of the anthraquinone 1.2.2'.1'-naphthacridone are dissolved in 100 parts of 96% sulphuric acid and a mixture of 10 parts of 94% nitric acid and 50 parts of 96% sulphuric acid run in slowly at 10-15° C. After three hours, the solution is poured into a large volume of water and filtered.

The product is found on analysis to correspond very nearly with a trinitro derivative, and the shade obtained by reduction and benzoylation is very similar to that obtained when the nitration is carried out in nitrobenzene.

The nitration is conveniently performed in presence of an organic solvent, such as nitrobenzene, but this is not essential. The nitrating agent may be nitric acid, or a mixture of sulphuric and nitric acids, or other known nitrating agent. According to the quantity of nitrating agent and the temperature conditions two or more nitro groups may be introduced.

The fastness of the vat dyes to chemick is improved by a treatment with bleach liquor. In the art, "chemic" or "chemik" is used to designate a bleaching treatment with sodium or calcium hypochlorite (S. H. Higgins, "Bleaching" 1921, page 3).

As many apparently widely different embodiments of this invention may be made without departing from the spirit and scope thereof, it is to be understood that we do not limit ourselves to the specific embodiments thereof except as defined in the appended claims.

We claim:

1. The step in the manufacture of vat dyes which comprises the treatment of anthraquinone-1.2.2'.1'-naphthacridone with a nitrating agent under such conditions as to introduce at least two nitro groups into the molecule.

2. The step in the manufacture of vat dyes which comprises the treatment of anthraquinone-1.2.2'.1'-naphthacridone with nitric acid under such conditions as to introduce at least two nitro groups into the molecule.

3. The step in the manufacture of vat dyes which comprises the treatment of anthraquinone-1.2.2'.1'-naphthacridone with a nitrating agent in an inert organic solvent under such conditions as to introduce at least two nitro groups into the molecule.

4. The step in the manufacture of vat dyes which comprises the treatment of anthraquinone-1.2.2'.1'-naphthacridone with nitric acid under such conditions as to introduce two nitro groups into the molecule.

5. The step in the manufacture of vat dyes which comprises the treatment of anthraquinone-1.2.2'.1'-naphthacridone with twice its weight of concentrated nitric acid at about 20-25° C. and separating the dinitro derivative so formed.

6. The step according to claim 1 followed by reduction of the product to amine, said reduction being effected by heating said nitro compound with a reducing agent.

7. The step according to claim 2 followed by reduction of the product to amine, said reduction being effected by heating said nitro compound with a reducing agent.

8. The step according to claim 3 followed by reduction of the product to amine, said reduction being effected by heating said nitro compound with a reducing agent.

9. The step according to claim 4 followed by reduction of the product to amine, said reduction being effected by heating said nitro compound with a reducing agent.

10. The step according to claim 5 followed by reduction of the product to amine, said reduction being effected by heating said nitro compound with a reducing agent.

11. In the manufacture of vat dyes the step which comprises the benzoylation of an anthraquinone-1.2.2'.1'-naphthacridone carrying at least two amino-groups, said benzoylation being effected by heating said amino compound with a benzoylating agent.

12. In the manufacture of vat dyes the step which comprises the benzoylation of a diamino-anthraquinone-1.2.2'.1'-naphthacridone, said benzoylation being effected by heating said amino compound with a benzoylating agent.

13. Process for the manufacture of vat dyes comprising the nitration of anthraquinone-1.2.2'.1'-naphthacridone under such conditions as to introduce at least two nitro groups into the molecule, reduction of the nitro derivative so formed to amine, and benzoylation of the resulting amine, said reduction being effected by heating said nitro compound with a reducing agent and said benzoylation being effected by heating said amine with a benzoylating agent.

14. A nitro derivative of anthraquinone-1.2.2'.1'-naphthacridone containing at least two nitro groups and no other substituents.

15. An amino derivative of anthraquinone-1.2.2'.1'-naphthacridone containing at least two amino groups and no other substituents.

16. Vat dyes which are anthraquinone-1.2.2'.1'-naphthacridones containing at least two benzol-amino groups and no other substituents.

17. Dibenzoyldiaminoanthraquinone-1.2.2'.1'-naphthacridone, which is a dark bluish-grey powder which dyes grey shades on cotton from a brown-purple hydrosulphite vat.

18. Anthraquinone-1.2.2'.1'-naphthacridone compounds containing at least 2 substituent groups of the class consisting of nitro, amino and benzoylamino groups and no other substituents, said substituent groups being the same.

19. Anthraquinone-1.2.2'.1'-naphthacridone compounds having the probable formula

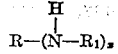

wherein R represents an anthraquinone-1.2.2'.1'-naphthacridone nucleus, $R_1$ represents hydrogen or a benzoyl group and $x$ represents 2, 3 or 4.

20. In the manufacture of vat dyes from anthraquinone-1.2.2'.1'-naphthacridone, the process which comprises reacting anthraquinone-1.2.2'.1'-naphthacridone with concentrated nitric acid until a poly-nitro compound is formed, reducing the poly-nitro compound thus obtained, by heating said poly-nitro compound with sodium sulfid to form the corresponding amino compound, reacting the poly-amino compound thus obtained, by heating said poly-amino compound with benzoyl chlorid to form the corresponding poly-benzoyl-amino compound.

21. The process of claim 20 in which the nitration is effected in the presence of a high-boiling, inert, organic solvent.

22. The process of claim 20 in which said nitration is performed in the presence of nitrobenzene.

23. In the manufacture of vat dyes from anthraquinone-1.2.2'.1'-naphthacridone, the step which comprises mixing approximately 10 parts of said naphthacridone compound with 10 to 50 parts of 90° nitric acid, maintaining the mixture at a temperature between 10 and 90° C. until a poly-nitro compound is obtained and then isolating said poly-nitro compound.

24. In the manufacture of vat dyes from anthraquinone-1.2.2'.1'-naphthacridone, the step which comprises mixing together said naphthacridone compound with nitric acid and an organic inert solvent, heating the mixture until a poly-nitro compound is obtained and then isolating the poly-nitro compound.

25. The process of claim 24 in which said organic inert solvent is ortho dichlorobenzene.

26. The process of claim 24 in which said organic inert solvent is nitro-benzene.

27. In the manufacture of vat dyes from anthraquinone-1.2.2'.1'-naphthacridone, the step which comprises mixing together about 10 parts of said naphthacridone compound, 35 parts of 94 per cent nitric acid, and 100 parts of nitro benzene, heating the mixture to 90° C. until a polynitro compound is formed, cooling the reaction mixture, filtering and recovering the precipitate of poly-nitro compound thus obtained.

28. In the manufacture of vat dyes from anthraquinone-1.2.2'.1'-naphthacridone, the steps which comprise reacting said naphthacridone compound with concentrated nitric acid until a poly-nitro compound is formed, mixing approximately 10 parts of the poly-nitro compound thus obtained with about 200 parts of water to form a fine paste, heating the paste to between 70 and 80° C., adding about 20 parts of sodium sulphide and maintaining the mixture at between 70 and 80° C. until a corresponding poly-amino compound is obtained and then isolating the poly-amino compound thus obtained.

29. In the manufacture of vat dyes from anthraquinone-1.2.2'.1'-naphthacridone, the steps which comprise mixing about 10 parts of a poly-amino compound of anthraquinone-1.2.2'.1'-naphthacridone with about 80 parts of nitro-benzene, heating the mixture to between 150 and 160° C., adding 10 parts of benzoyl chloride, maintaining the mixture at between 150 and 160° C. until a poly-benzoyl amino compound is obtained and then isolating the dyestuff thus obtained.

30. In the manufacture of vat dyes from anthraquinone-1.2.2'.1'-naphthacridone, the steps which comprise reacting said naphthacridone compound with concentrated nitric acid until a poly-nitro compound is formed, reducing the poly-nitro compound thus obtained to form a corresponding amino compound, by heating said poly-nitro compound with a reducing agent, mixing the amino compound thus obtained with nitrobenzene, heating the mixture, adding benzoyl chloride and continuing the heating until the corresponding poly-benzoyl amino compound is formed, and isolating the dyestuffs thus obtained.

PHILIP FLETCHER BANGHAM.
ROBERT FRASER THOMSON.